(12) United States Patent
Wöhler et al.

(10) Patent No.: US 11,656,143 B2
(45) Date of Patent: May 23, 2023

(54) METHOD AND DEVICE FOR BALANCING

(71) Applicant: thyssenkrupp AG, Essen (DE)

(72) Inventors: Kevin Wöhler, Ilsenburg (DE); Frank Altag, Klein-Denkte (DE)

(73) Assignee: THYSSENKRUPP AG, Essen (DE)

( * ) Notice: Subject to any disclaimer, the term of this patent is extended or adjusted under 35 U.S.C. 154(b) by 0 days.

(21) Appl. No.: 16/757,496

(22) PCT Filed: Nov. 5, 2018

(86) PCT No.: PCT/EP2018/080180
§ 371 (c)(1),
(2) Date: Apr. 20, 2020

(87) PCT Pub. No.: WO2019/086669
PCT Pub. Date: May 9, 2019

(65) Prior Publication Data
US 2020/0264065 A1    Aug. 20, 2020

(30) Foreign Application Priority Data

Nov. 6, 2017  (DE) ...................... 10 2017 125 889.2

(51) Int. Cl.
*G01M 1/34* (2006.01)
*G01M 1/16* (2006.01)

(52) U.S. Cl.
CPC ................ *G01M 1/16* (2013.01); *G01M 1/34* (2013.01)

(58) Field of Classification Search
CPC .................................. G01M 1/16; G01M 1/34
See application file for complete search history.

(56) References Cited

U.S. PATENT DOCUMENTS

| | | | | |
|---|---|---|---|---|
| 2,954,711 A | * | 10/1960 | Heinrich | G01M 1/34 408/1 R |
| 3,491,493 A | * | 1/1970 | Deist | G01M 1/34 451/920 |
| 3,553,903 A | * | 1/1971 | Christie | B29D 30/0633 451/24 |
| 3,574,973 A | * | 4/1971 | Rader | G01M 1/16 451/28 |

(Continued)

FOREIGN PATENT DOCUMENTS

| | | |
|---|---|---|
| CN | 1228829 A | 9/1999 |
| CN | 1711480 A | 12/2005 |

(Continued)

OTHER PUBLICATIONS

English Translation of DE 102012216867 (Year: 2012).*

(Continued)

*Primary Examiner* — Alexander A Mercado
(74) *Attorney, Agent, or Firm* — thyssenkrupp North America, LLC (57) ABSTRACT

Methods of balancing a workpiece, in which the workpiece is rotated about an axis of rotation. The forces and/or torques that result from an unbalance of the workpiece during the rotation of the workpiece are measured, and material is removed from the workpiece to reduce the unbalance. The method includes removal of material from the rotating workpiece during measuring or as the workpiece is continuously rotated between measuring and material removal.

10 Claims, 4 Drawing Sheets

(56) References Cited

U.S. PATENT DOCUMENTS

| | | | | |
|---|---|---|---|---|
| 3,724,137 A * | 4/1973 | Hofelt, Jr. | G01M 1/34 | 451/920 |
| 3,841,033 A * | 10/1974 | Appleby | B24B 49/165 | 451/24 |
| 3,866,360 A * | 2/1975 | Monajjem | B24B 49/165 | 451/6 |
| 3,914,907 A * | 10/1975 | Hofelt, Jr. | B24B 49/165 | 451/28 |
| 3,932,965 A * | 1/1976 | Kline, Jr. | B29D 30/0633 | 451/28 |
| 3,946,527 A * | 3/1976 | Beer | G01M 1/34 | 73/146 |
| 3,963,427 A * | 6/1976 | Ugo | B24B 49/165 | 451/28 |
| 4,041,647 A * | 8/1977 | Ugo | G01M 1/34 | 451/920 |
| 4,047,338 A * | 9/1977 | Gormish | B29D 30/0633 | 451/28 |
| 4,112,630 A * | 9/1978 | Brown, Jr. | B24B 49/165 | 451/28 |
| 4,128,969 A * | 12/1978 | Gormish | B24B 49/165 | 451/1 |
| 4,173,850 A * | 11/1979 | Gormish | B29D 30/0633 | 451/28 |
| 4,244,416 A * | 1/1981 | Newton | G01M 1/34 | 157/13 |
| 4,464,934 A * | 8/1984 | Giers | G01M 1/22 | 73/462 |
| 4,501,947 A * | 2/1985 | Kerlin | G01M 1/34 | 219/130.4 |
| 5,483,855 A * | 1/1996 | Julow | B23C 3/00 | 82/903 |
| 5,493,763 A * | 2/1996 | Yamanaka | G01M 1/34 | 82/903 |
| 5,586,625 A * | 12/1996 | Julow | G01M 1/34 | 188/78 |
| 5,871,314 A * | 2/1999 | Trionfetti | G01M 1/34 | 409/165 |
| 5,992,581 A * | 11/1999 | Julow | G01M 1/34 | 188/78 |
| 6,279,699 B1 * | 8/2001 | Hester | F16D 65/0006 | 188/78 |
| 6,303,896 B1 * | 10/2001 | Kopp | F16K 31/52 | 219/121.73 |
| 6,520,012 B1 * | 2/2003 | Schonfeld | G01M 1/34 | 73/462 |
| 6,575,030 B1 * | 6/2003 | Lauf | G01M 1/04 | 73/487 |
| 6,655,208 B1 * | 12/2003 | McClanahan | G01M 1/34 | 73/462 |
| 6,786,800 B1 * | 9/2004 | Delmoro | B24B 5/366 | 451/49 |
| 7,784,592 B1 * | 8/2010 | Denstedt | F16D 65/0006 | 188/218 XL |
| 2001/0015307 A1 * | 8/2001 | Hester | B23C 3/00 | 188/74 |
| 2004/0178026 A1 * | 9/2004 | Runels | G01M 1/34 | 188/71.1 |
| 2005/0092560 A1 * | 5/2005 | Brotherton | F16D 65/10 | 188/218 R |
| 2007/0095231 A1 * | 5/2007 | Van Denend | B41F 13/085 | 101/375 |
| 2010/0061822 A1 * | 3/2010 | Gerber | G01M 1/34 | 409/141 |
| 2010/0144243 A1 * | 6/2010 | De Gradi | B29D 30/0633 | 451/283 |
| 2011/0023599 A1 * | 2/2011 | Zhu | G01M 1/06 | 73/462 |
| 2013/0308430 A1 * | 11/2013 | Verardo | G04D 7/088 | 368/200 |
| 2016/0084727 A1 * | 3/2016 | Perelman | G01M 1/34 | 73/462 |
| 2016/0123150 A1 * | 5/2016 | Stone | F04D 29/325 | 416/144 |
| 2018/0120191 A1 * | 5/2018 | Holland | G01M 1/24 | |

FOREIGN PATENT DOCUMENTS

| | | | | |
|---|---|---|---|---|
| CN | 104410231 A | | 3/2015 | |
| DE | 19 60 506 U | | 5/1967 | |
| DE | 2946581 A1 * | | 11/1981 | |
| DE | 196 41 494 A | | 4/1998 | |
| DE | 196 45 181 A | | 5/1998 | |
| DE | 100 35 340 A | | 4/2001 | |
| DE | 102004007899 A1 * | | 9/2004 | F16D 65/0006 |
| DE | 102009021725 A1 * | | 11/2010 | F01D 5/027 |
| DE | 10 2010 063 037 A1 | | 6/2012 | |
| DE | 10 2012 216 867 A | | 4/2013 | |
| DE | 10 2013 207 300 A | | 10/2014 | |
| DE | 10 2017 001 321 A | | 8/2017 | |
| EP | 0754937 A2 * | | 1/1997 | |

OTHER PUBLICATIONS

English Translation of DE 1960506 (Year: 1967).*
English Translation of DE 19645181 (Year: 1996).*
English translation of DE-102009021725-A1 (Year: 2010).*
English translation of DE-2946581-A1 (Year: 1981).*
English translation of EP-0754937-A2 (Year: 1997).*
Machine shop 2—lathe cutting speeds—rpm calculations, (n.d.). Retrieved Nov. 30, 2022, from https://www.wisc-online.com/LearningContent/mtl11802/mtl11802/mlt11802.htm (Year: 2022).*
English Translation of International Search Report issued in PCT/EP2018/080180, dated Feb. 4, 2019.

* cited by examiner

METHOD AND DEVICE FOR BALANCING

CROSS REFERENCE TO RELATED APPLICATIONS

This application is a U.S. National Stage Entry of International Patent Application Serial Number PCT/EP2018/080180, filed Nov. 5, 2018, which claims priority to German Patent Application No. DE 10 2017 125 889.2, filed Nov. 6, 2017, the entire contents of both of which are incorporated herein by reference.

FIELD

The present disclosure generally relates to a method for balancing a workpiece.

BACKGROUND

The invention relates to a method for balancing a workpiece, having the features of the preamble of claim 1. The invention also relates to a device for balancing a workpiece, having the features of the preamble of claim 9. A method of this type and a device of this type are known, for example, from DE 196 45 181 A1.

There are high requirements for the operational quality of fast-rotating components. This holds true in particular for rotors of electric machines. For this reason, unbalances on such components have to be eliminated. For this purpose, various methods exist:
- additive methods, in which additional masses are applied to the body to be balanced
- subtractive methods, in which mass is removed from non-critical regions, usually by drilling. For this, dedicated balancing parts (balancing disks) are usually provided, at which material can be removed.
- Also known is mass-neutral balancing by changing over balancing bodies, e.g. screws, from one position to another.

The balancing takes place iteratively with a plurality of repetitions, until a particular quality class is achieved.

Known from the prior art are
- balancing machines, which exclusively determine the unbalance and make an indication as to the angular position and size of a necessary equalizing weight or of a weight to be removed
- balancing centers with an integrated machining unit, which determine the unbalance and, after the measurement operation, fully automatically remove material at the determined angular position.

A disadvantage of the known prior art is the relatively high duration of a working cycle (determine unbalance, equalize unbalance). This is clearly the case with pure balancing machines, in which the workpiece has to be unclamped, clamped into the machining machine (for example drilling machine) and, after the machining, reclamped into the balancing machine for the next iteration cycle. In the case of balancing centers, as in that stated in the introduction in accordance with DE 196 45 181 A1, the iteration cycles are indeed reduced. Nevertheless, the workpiece has to be halted for each machining and brought back to the target rotational speed for the next measurement cycle. This is time-consuming and, by virtue of the constant accelerating and decelerating, energy-intensive.

Thus a need exists for a method and a device for balancing a workpiece, in which the process times can be shortened.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to methods of balancing a workpiece. The invention also relates to a device for balancing a workpiece.

In some examples, a solution for the problems discussed in the background can be achieved by a method for balancing a workpiece, in which the workpiece is rotated about an axis of rotation. Here, the forces and/or torques and/or oscillations that result during the rotation of the workpiece on account of an unbalance of the workpiece are measured. Material of the workpiece is removed to reduce the unbalance. The invention is distinguished by virtue of the fact that the material is removed from the rotating workpiece during the measuring. As an alternative, if the measuring and material removing are effected separately in terms of time, the workpiece is continuously rotated between the measurement and material removal.

The invention has the advantage that the process times are shortened, because between the measuring and material removing, the workpiece does not come to a standstill. In the best case, measurement and material removal occur at the same time. The workpiece is not slowed down during the entire balancing operation. The work step "correcting by way of material removal" is carried out in full operation, i.e. the workpiece is not slowed down to a standstill.

The process times are shortened in comparison to the prior art even if the measuring and material removing are effected separately in terms of time, because the workpiece is continuously rotated between these two steps. The slowing down and starting up of the workpiece are thus omitted here, too.

In a particularly advantageous embodiment, the balancing operation comprises a rough balancing and a subsequent fine balancing. More material is removed during rough balancing than during fine balancing. Here, rough balancing and fine balancing are preferably carried out by removing material at different locations.

In a particularly advantageous embodiment, the balancing operation comprises exactly one measuring operation and exactly one material removing operation. At a first target rotational speed, the unbalance is measured and a target contour of the balancing body is calculated. At a second target rotational speed, the target contour is applied by removing material on the balancing body.

Shortened process times are ultimately also achieved in the event that measuring and material removing are separated in terms of time, when the measurement process takes place at a first target rotational speed and the material removal process takes place at a second target rotational speed, where the second target rotational speed is lower than the first target rotational speed. In this case, for the material removal process, the workpiece has to be partially, but not completely, slowed down; for the measurement process, the workpiece has to be accelerated to a less pronounced extent to the higher, first target rotational speed. The first target rotational speed can be above 3 000 revolutions/minute, e.g. at 4 000 revolutions/minute. The second target rotational speed can be lower than 3 000 revolutions/minute, e.g. at 1 500 revolutions/minute. Preferred embodiments of the invention are specified in the dependent claims.

The material removal can be effected by machining processes. The material removal can be effected in particular by defined or undefined cutting edges. In particular, the material removal is effected while supplying a cooling medium, such as, for example, an oil or a grinding emulsion. The machining by grinding has the advantage that the profile of the workpiece can be precisely changed. The eccentricity of the workpiece that exists when an unbalance is present can be eliminated particularly well by grinding and creating a nonround outer contour of the workpiece.

Further preferably, the material of the workpiece is removed in a direction radially and/or parallel and/or obliquely to the axis of rotation to reduce the unbalance. For reasons of simple accessibility, the radial and oblique/radial variants are particularly preferred.

As an alternative or at the same time, it is also possible to eliminate the unbalance by asymmetrically removing material on an end side or end face of the workpiece. This can be effected, for example, by axially advancing a machining means onto the end side or end face.

The advancing movement during the material removal can be achieved by a relative movement between the workpiece and a machining means. The relative movement can be effected, for example, by a rotary and/or translatory movement of the workpiece and/or by a rotary and/or translatory movement of the machining means.

During the removal of material of the workpiece to reduce the unbalance, advancement can occur cyclically. The cyclic advancement can be effected directly, wherein the machining means is moved toward the workpiece, which is rotating in a positionally fixed manner. To rotate in a positionally fixed manner means that the workpiece rotates about a stationary axis of rotation. As an alternative, the rotating workpiece can be advanced in the direction of the machining means. This means that a bearing table of the machining unit or at least parts thereof can be moved together with the workpiece rotating thereon.

The advancement is advantageously configured here such that, in the machining contact between workpiece and machining means, the relative speed is approximately the same at all times.

The workpiece preferably has a balancing body, the material of which is removed to reduce the unbalance, wherein a nonround outer contour of the balancing body is created. The balancing body has the advantage that a material well suited for the removal and/or a corresponding geometry of the balancing body can be used.

If the workpiece comprises a plurality of separate balancing bodies, the material thereof can be removed at the same time to reduce the unbalance.

With regard to the device for balancing a workpiece, the object is achieved specifically by a device for balancing a workpiece with a clamping unit for the workpiece and a rotary drive for the rotation of the workpiece about an axis of rotation. The device has at least one sensor for the measurement of forces and/or torques and/or oscillations caused by an unbalance of the workpiece during the rotation of the workpiece. The device also has a machining unit for the removal of material of the workpiece by rotating the workpiece. According to the invention, the machining unit can be activated on the basis of the signals of the sensor such that the material can be removed during the rotation of the workpiece to reduce the unbalance.

Like the method according to the invention, the device according to the invention is based on correlating the measurement operation and the machining operation with one another in order to reduce the process time. In this regard, provision is made according to the invention that the machining unit can be activated on the basis of the signals of the sensor such that the material can be removed during the rotation of the workpiece to reduce the unbalance.

The machining unit may comprise a machining means, which interacts with the workpiece to remove the material. The machining unit preferably comprises a grinding unit with a grinding disc or a grinding belt as machining means.

The machining means may be of stationary or movable design. The stationary design of the machining means means that the relative movement between the workpiece and the machining means is effected exclusively by the rotation of the workpiece. The relative speed between the machining means and the workpiece corresponds to the rotational speed of the workpiece multiplied by the current radius of the balancing body or workpiece. When the machining means is of movable design, the relative movement between the workpiece and the machining means may be effected by a rotational movement in the same direction as or in the opposite direction to the rotational movement of the workpiece. The effective relative speed results from the surface speed of the workpiece or of the balancing body superposed with the surface speed of the machining means.

In the case of one preferred embodiment, the machining unit can be moved parallel to the axis of rotation, so that a plurality of balancing bodies spaced axially, i.e. along the axis of rotation, can be machined.

Particularly preferred is an embodiment in which a plurality of machining units is arranged at a spacing along the axis of rotation, so that the machining of a plurality of balancing bodies at the same time is possible, as a result of which the process times are further reduced.

The clamping unit preferably has bearing means for receiving shaft seats of the workpiece or a centering spindle for the end-side fastening of the workpiece. The centering spindle has the advantage that the machining of the bearing seats can also be effected by the machining unit, as a result of which the efficiency of the device is increased.

A further preferred embodiment makes provision that further surfaces can be machined by the machining unit. The invention will be explained more fully with further details on the basis of exemplary embodiments with reference to the appended schematic drawings.

The workpiece to be balanced is in particular a rotor of an electric machine, for example a synchronous or asynchronous machine, wherein the rotor is configured to rotate about an axis of rotation. The rotor may comprise a laminated core and a shaft. It may comprise balancing disks. In the case of asynchronous machines, the rotor may comprise a squirrel cage comprising short-circuiting bars and short-circuiting rings. In this case, the short-circuiting bars may project axially beyond the short-circuiting rings.

For the purposes of balancing, the removing of material preferably takes place at one or more of the following machining positions: the circumferential surface of a laminated core, of a short-circuiting ring and/or of a balancing disk, and an end face of a balancing disk or of a short-circuiting ring. Provided that short-circuiting bars project axially beyond the short-circuiting rings, the machining may take place at the axially projecting portions of the short-circuiting bars. The machining may also take place at other elements, such as end-side terminating elements of a rotor laminated core. For example, the machining may take place at a centrifugal cap of a current-excited synchronous machine. "Centrifugal cap" is understood to be an end-side terminating element which borders rotor windings, projecting beyond the rotor laminated core, in order to receive the centrifugal forces acting on the rotor windings.

Furthermore, the balancing may also take place on the shaft of the rotor itself.

In an advantageous embodiment, the balancing may take place a rough balancing, preferably close to the axis of rotation of the rotor, for example on the shaft, and a fine balancing, preferably at a distance from the axis, for example on the laminated core.

Figure 1:
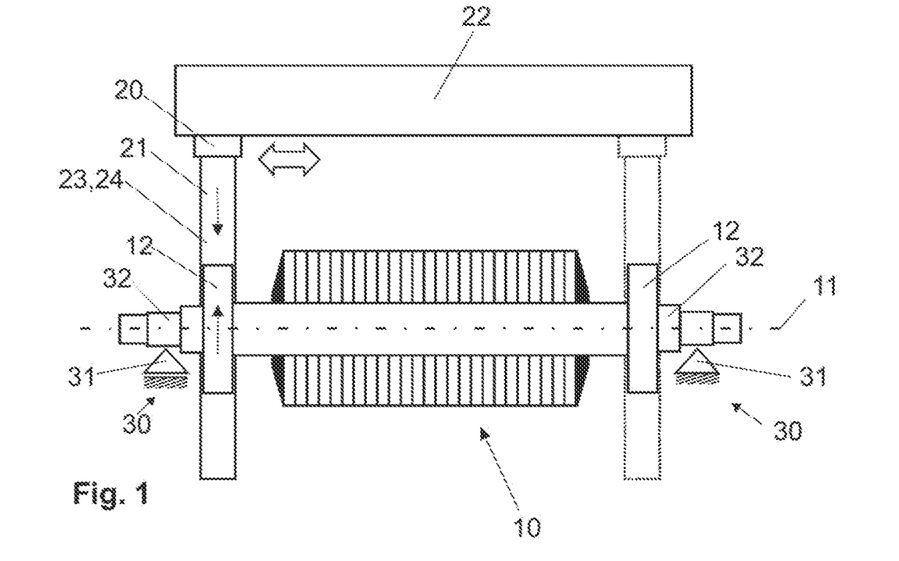
FIG. 1 is a front view of a device for balancing a workpiece according to an exemplary embodiment, with a grinding unit, that can be moved parallel to the axis, with a grinding disk.

Furthermore, one or more shielding elements may be provided at the balancing device and/or the balancing piece. As a result, for example, dirt-sensitive parts of the rotor can be protected against the ingress of dirt, such as grinding dust or grinding chips, and/or subsequent cleaning effort can be reduced. FIG. 1 shows an example for a device for balancing a workpiece 10, in particular for balancing a rotor for an electric motor. In the context of the invention, the device per se, i.e. without the workpiece 10, is also disclosed and claimed. As illustrated in FIG. 1, the device is, however, also disclosed and claimed together with the workpiece 10 to be balanced.

Figure 2:
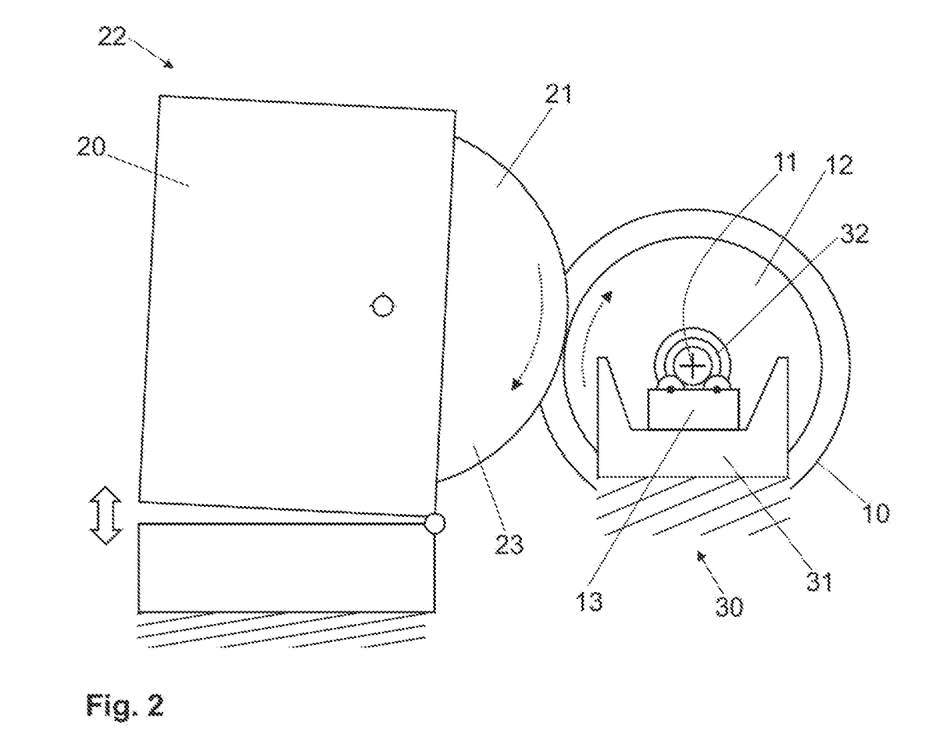
FIG. 2 is a detailed view of the grinding unit according to FIG. 1 from the side.
Figure 3:
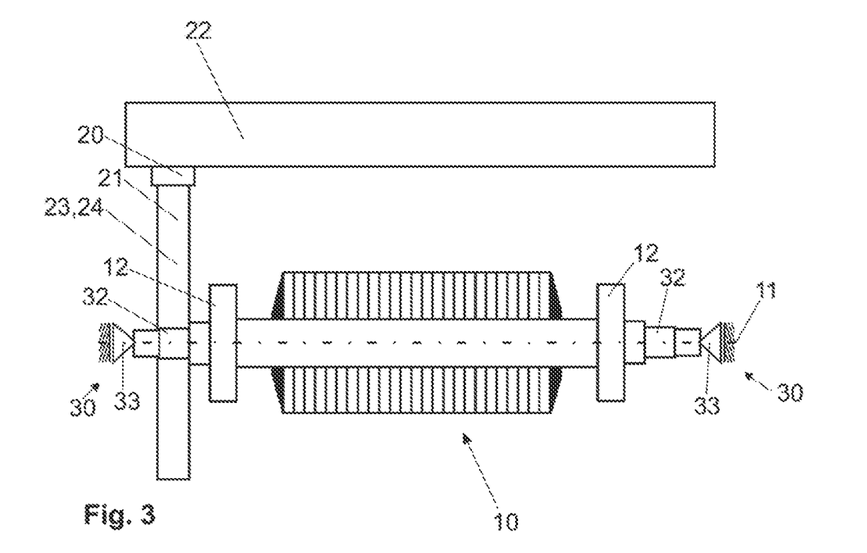
FIG. 3 is a front view of a device for balancing a workpiece according to a further exemplary embodiment, with a grinding belt for machining the bearing seats.

The device comprises a clamping unit 30 with bearing means 31 to support the shaft seats 32 of the workpiece 10. Instead of the bearing means 31, a centering spindle 33, as shown in FIG. 3, can be used if it is intended for the bearing seats 32 to be machined. The clamping unit 30 defines an axis of rotation 11, about which the workpiece 10 can be rotated in the clamped-in state, as shown in FIG. 1. The rotational movement is created by a rotary drive 13, as shown by way of example in FIG. 2. The rotary drive 13 may be embodied as a roller drive. Other rotary drives 13 are possible.

The device comprises at least one sensor, in particular a plurality of sensors (not illustrated), which are designed to measure the forces and/or torques and/or oscillations that act or result on account of an unbalance of the workpiece 10 during rotation. The sensors are connected to a data processing unit, which is likewise not illustrated. The data processing unit is configured or adapted to process and forward the sensor signals for activation of the machining unit 20.

Figure 6:
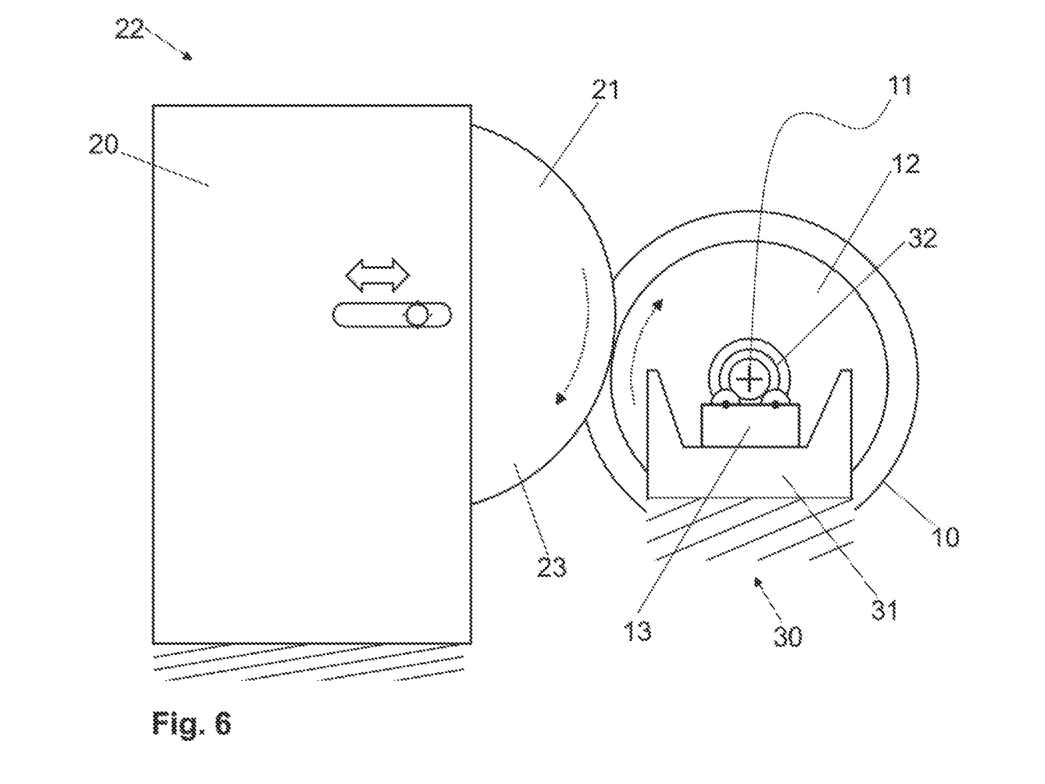
FIG. 6 is a detailed view of an alternative embodiment of the exemplary embodiment according to FIGS. 1 and 2, in which the machining means can be advanced in a translatory manner.

In the example according to FIG. 1, the machining unit 20 is designed as a grinding unit 22 with a grinding disk 23. As shown in FIG. 2, the grinding disk 23 can be moved, in the example of FIG. 2 is mounted in a tiltably movable manner (see double-headed arrow), so that an advancing movement in a radial direction perpendicular to the axis of rotation 11 is possible. The grinding disk 23 and the workpiece 10 rotate in opposite directions. Another possibility of bringing about the relative movement between the workpiece 10 and the grinding disk 23 is indicated in FIG. 6. Here, the grinding disk 23 is moved linearly in the direction of the workpiece 10, in order to control the mechanical removal of material.

The machining unit 20, specifically the grinding unit 22, can be activated on the basis of the signals of the sensor or of the sensors. The aforementioned data processing unit, which is connected to the sensor or to the sensors, may carry out the activation. The activation of the grinding unit 22, specifically the advancing movement, is effected on the basis of the signals of the sensor such that the material of the workpiece 10 is removed to reduce the unbalance. There is a direct relationship between the measurement operation and the material removing on account of the signal connection between the sensors and the grinding disk 21. In the example, the workpiece 10 is equipped with two balancing bodies 12 in the form of disks, specifically on the shaft of the workpiece 10. To reduce the unbalance, in the example material is removed from the balancing bodies 12 of the workpiece 10. Another number of balancing bodies 12 is possible. The grinding unit 22 can be moved parallel to the axis of rotation 11 so that the two balancing bodies 12 can be machined by one and the same grinding unit 22.

The balancing process is continued until a desired balance quality is achieved. For high-rotational-speed rotors, this can be e.g. a balance quality G of 2.5 or better (c.f. the international standard to ISO 1940-1).

A possible process sequence for the example is as follows: The workpiece 10 is clamped in and rotated at a first target rotational speed. Then, the balancing process begins. An unbalance is determined by suitable means and transferred to a control unit (not shown) (step 1). The workpiece is accelerated to a second target rotational speed appropriate for the grinding process and machined by means of the grinding unit in accordance with the control presets of the control unit (step 2). Subsequently, the workpiece is moved back to the first target rotational speed, and the unbalance is measured again (step 1). If the determined balance quality does not yet correspond to the desired balance quality, steps 2 and 1 are repeated until the desired balance quality is achieved.

If said balance quality is achieved, the balancing process is ended; the workpiece is then slowed down to a standstill and unclamped. Characteristic of this method example according to the invention is that, during the entire balancing process, the workpiece is not slowed down to a standstill but rotates continuously. The rotational speed may vary here, in particular between the measurement operation and the material removing operation. Nevertheless, during the actual method, the workpiece never achieves a speed of zero.

Furthermore, the machining device 20 may be configured such that a further surface machining of the outer circumference of the workpiece, e.g. of the surface of a laminated core, may also be effected in this way.

Where the workpiece 10 provides sufficiently non-functional dead material, which can be removed to reduce the unbalance, balancing disks 12 of the workpiece 10 can be omitted.

As non-functional dead material, for example, a short-circuiting ring or a laminated core of a rotor also come into question.

Figure 4:
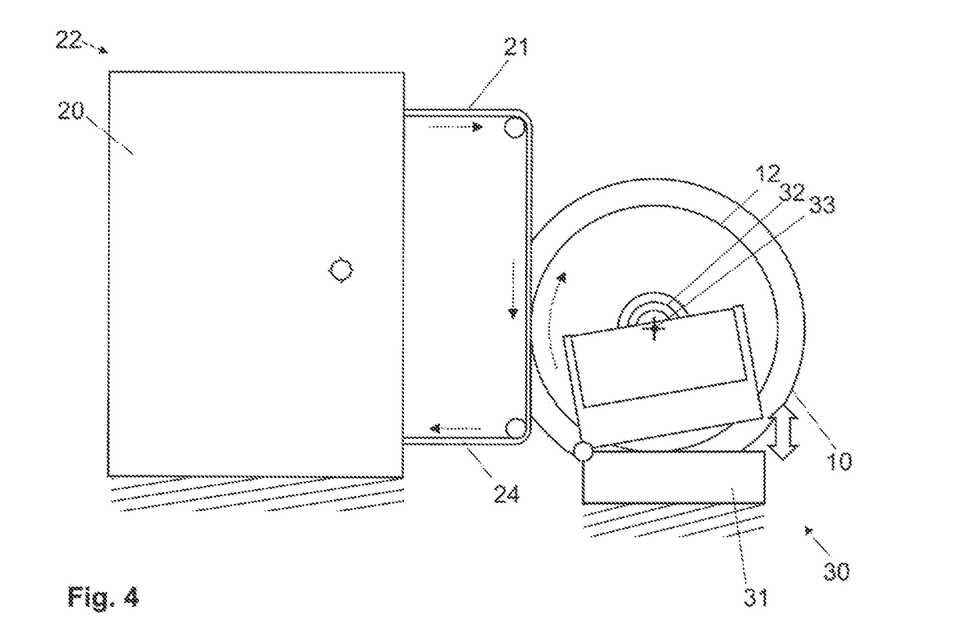
FIG. 4 is a detailed view of the grinding unit according to FIG. 3 from the side.
Figure 5:
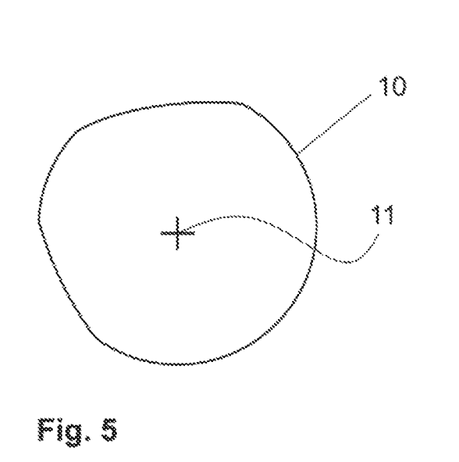
FIG. 5 is a machined balancing body, which has been ground to a crown or in a nonround manner from a circular starting shape.

The device according to FIGS. 3 and 4 is based on the same principle as the device according to FIGS. 1 and 2.

Instead of the grinding disk 23, however, the machining means 21 is designed as a grinding belt 24. The grinding belt 24 or the grinding unit 22 is, as illustrated in FIG. 1, arranged to be movable parallel to the axis of rotation 11. As an alternative, a plurality of grinding units 22 (each with a grinding belt 24 or grinding disk 21) may be provided, so that the balancing body 12 can be machined at the same time. A further difference with respect to the device according to FIG. 1 consists in the fact that the clamping unit 30 comprises a centering spindle 33, so that so that the bearing seats 32 of the workpiece 10 can be machined. Consequently, the grinding unit 22 has a multiple function. As described in conjunction with FIG. 1, the grinding unit 22 makes it possible to reduce the unbalance by material removal. Furthermore, in addition the bearing seats 32 can be machined, as a result of which overall the efficiency of the device is improved.

The advancing movement of the machining means 21 is not effected by a movement of the grinding unit 22, but by a tilting movement of the clamping unit 30 (see double-headed arrow according to FIG. 4). This achieves a reduction in the spacing between the axis of rotation 11 and the grinding belt 24.

With respect to the rest of the features of the device, reference is made to the statements in conjunction with FIGS. 1 and 2.

The devices according to FIGS. 1 to 4 function e.g. as follows (method):

The workpiece 10 is clamped into the clamping unit 30 and rotated about the axis of rotation 11. The rotary drive 13 is provided for this purpose. One or more sensors measure the forces and/or torques and/or oscillations that result on account of the unbalance of the workpiece 10 during the rotation. To reduce the unbalance, during the measurement operation the material of the workpiece 10 is removed (directly or via the balancing body or the balancing bodies 12). The removal is effected by grinding. Other material removing methods are possible.

As an alternative to the simultaneous measurement and correction, it is possible that the measuring and material removal are effected separately in terms of time. In this case, the workpiece 10 continues to continuously rotate between these two operations.

Figure 7:
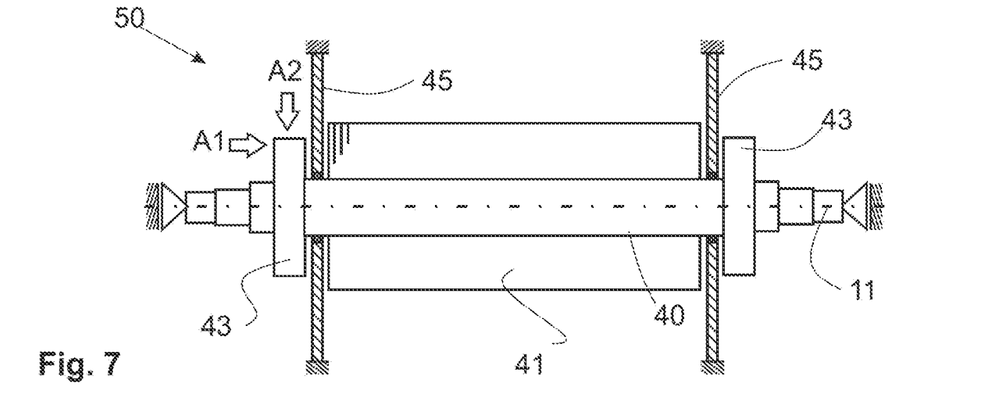
FIG. 7 is a schematic view of a rotor, in the case of which the balancing is performed at balancing disks.

FIG. 7 schematically illustrates a rotor 50. The rotor has a shaft 40, a laminated core 41 and two balancing disks 43. The balancing disk is magnetically inactive and consists customarily of iron. During the balancing operation, the magnetically active part of the rotor (rotor laminated core, magnets or winding) is separated from the balancing disk 43 by a shielding element 45. For balancing, material is removed at at least one of the balancing disks 43 according to one of the abovementioned methods. In this case, the balancing disk can be ground in a nonround manner over the circumferential face (A2). As an alternative, it is possible to machine the balancing disk at the face side (A1) by axially advancing a machining means.

Figure 8:
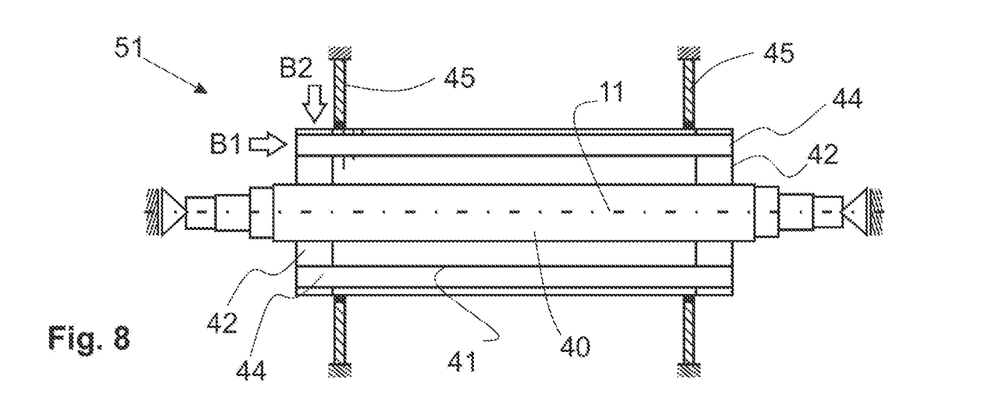
FIG. 8 is a schematic view of an asynchronous rotor, in the case of which the balancing is performed at short-circuiting rings.

FIG. 8 schematically illustrates a rotor 51 corresponding to FIG. 7. In contrast to FIG. 7, the rotor has a squirrel cage with short-circuiting bars 44 and short-circuiting rings 42. A short-circuiting ring is the end-side electric connecting element of a squirrel cage in an asynchronous machine. The squirrel cage may be cast or assembled (from short-circuiting bars and short-circuiting rings). The short-circuiting bars 44 finish flush with the short-circuiting rings 42. Axially, they do not reach beyond the short-circuiting rings. A shielding element 45 is attached to protect the laminated core from grinding dust or the like. The rotor does not have any balancing disks. For balancing, material is removed at at least one of the short-circuiting rings 42 according to one of the abovementioned methods. In this case, the short-circuiting ring 42 can be ground in an nonround manner over the circumferential face (B2). As an alternative, it is possible to machine the short-circuiting ring 42 at the end side (31) by axially advancing a machining means.

Figure 9:
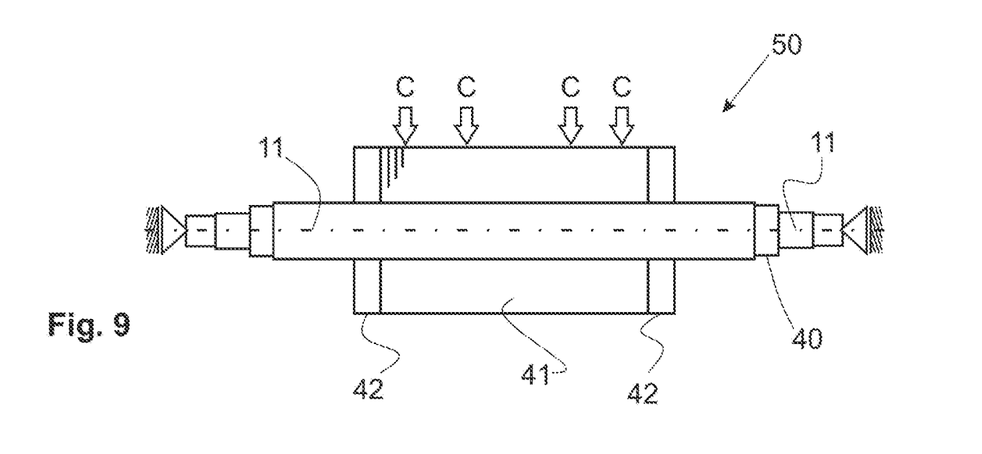
FIG. 9 is a schematic view of a rotor, in the case of which the balancing is performed at the circumferential surface of a laminated core.

FIG. 9 schematically illustrates a rotor 50 corresponding to FIG. 7. In contrast to FIG. 7, for the purposes of balancing the rotor is machined at the circumferential surface (C) of the laminated core. Here, the laminated core as such is ground in a nonround manner. This may be used particularly advantageously for asynchronous machines with cast squirrel cages, since, in the case of cast squirrel cages, the laminated core has to be post-machined in any case on account of casting residues swelling out between sheet-metal laminations of the laminated core. Here, too, a separate balancing disk can be dispensed with.

LIST OF REFERENCE SIGNS

A1, A2, B1, B2, C Machining positions for balancing
10 Workpiece
11 Axis of rotation
12 Balancing body
13 Rotary drive
20 Machining unit
21 Machining means
22 Grinding unit
23 Grinding disk
24 Grinding belt
30 Clamping unit
31 Bearing means
32 Shaft seat
33 Centering spindle
40 Rotor shaft
41 Rotor laminated core
42 Short-circuiting ring (of an asynchronous machine)
43 Balancing disk/balancing body
44 Short-circuiting bars
45 Shielding element
50 Rotor (of an electric machine)
51 Rotor (of an asynchronous machine)

What is claimed is:
1. A method for balancing a workpiece, comprising
   rotating the workpiece about an axis of rotation, wherein the workpiece comprises a balancing disk with a fully-round outer contour;

measuring the forces and/or torques and/or oscillations that result during the rotation of the workpiece from an unbalance of the workpiece; and removing material of the balancing disk so as to reduce the unbalance and cause the balancing disk to have a non-round outer contour, wherein the material is removed from the rotating workpiece during said measuring, wherein the balancing disk is disposed on a shaft of the workpiece, wherein the balancing disk is distinct from and spaced apart from a functional portion of the workpiece along the shaft of the workpiece, wherein a machining means for removing material of the balancing disk is of movable design, wherein removing material of the balancing disk comprises rough balancing where a first amount of material is removed from the balancing disk and fine balancing where a second amount of material is removed from the balancing disk, with the first amount of material being greater than the second amount of material, wherein the rough balancing and the fine balancing occur at different locations of the balancing disk.

2. The method of claim 1 wherein the material of the workpiece is removed by a defined cutting edge to reduce the unbalance.

3. The method of claim 1 wherein the material of the workpiece is removed in a direction obliquely to the axis of rotation to reduce the unbalance.

4. The method of claim 1 wherein during said removing of material, advancement occurs by way of a relative movement between the workpiece and a machining means.

5. The method of claim 4 wherein during said removing of material of the workpiece to reduce the unbalance, advancement occurs cyclically.

6. The method of claim 1 wherein the balancing disk is one of a plurality of balancing disks of the workpiece that have fully-round outer contours, the material thereof being removed at the same time to reduce the unbalance.

7. The device of claim 1 wherein a machining means for removing material of the balancing disk is of movable design.

8. The device of claim 7 comprising asymmetrically removing material from an axial end face of the workpiece.

9. The method of claim 1 wherein removing material of the balancing disk comprises removing material from a non-functional surface of the balancing disk of the workpiece.

10. The method of claim 1 wherein removing material of the balancing disk comprises rough balancing where a first amount of material is removed from the balancing disk and fine balancing where a second amount of material is removed from the balancing disk, with the first amount of material being greater than the second amount of material, wherein the rough balancing and the fine balancing occur at different locations of the balancing disk.

* * * * *